US012681342B2

(12) United States Patent
Liang et al.

(10) Patent No.: US 12,681,342 B2
(45) Date of Patent: Jul. 14, 2026

(54) WAVEGUIDE LINE ELECTRODE STRUCTURE AND ELECTRO-OPTIC MODULATOR

(71) Applicant: NANJING LYCORE TECHNOLOGIES CO., LTD., Nanjing (CN)

(72) Inventors: Hanxiao Liang, Suzhou (CN); Yipin Song, Suzhou (CN); Yingcong Zhou, Suzhou (CN); Haicang Wu, Suzhou (CN); Wenhao Mao, Suzhou (CN); Shiwei Song, Suzhou (CN); Weiqi Sun, Suzhou (CN); Qingyang Yu, Suzhou (CN)

(73) Assignee: NANJING LYCORE TECHNOLOGIES CO., LTD., Nanjing (CN)

( * ) Notice: Subject to any disclaimer, the term of this patent is extended or adjusted under 35 U.S.C. 154(b) by 327 days.

(21) Appl. No.: 18/573,852

(22) PCT Filed: Jun. 21, 2022

(86) PCT No.: PCT/CN2022/100239
§ 371 (c)(1),
(2) Date: Dec. 22, 2023

(87) PCT Pub. No.: WO2022/268090
PCT Pub. Date: Dec. 29, 2022

(65) Prior Publication Data
US 2024/0337871 A1      Oct. 10, 2024

(30) Foreign Application Priority Data
Jun. 25, 2021   (CN) ......................... 202110712563.3

(51) Int. Cl.
*G02F 1/035* (2006.01)
*H01P 3/00* (2006.01)

(52) U.S. Cl.
CPC ............ *G02F 1/0356* (2013.01); *H01P 3/003* (2013.01)

(58) Field of Classification Search
CPC .............................. G02F 1/0356; H01P 3/003
See application file for complete search history.

(56) References Cited

U.S. PATENT DOCUMENTS

| | | | |
|---|---|---|---|
| 5,675,673 | A | 10/1997 | Skeie |
| 6,310,700 | B1 | 10/2001 | Betts |

(Continued)

FOREIGN PATENT DOCUMENTS

| | | |
|---|---|---|
| CN | 103424895 A | 12/2013 |
| CN | 110609399 | 12/2019 |

(Continued)

OTHER PUBLICATIONS

Office Action in Chinese Appln. No. 202110712563.3, mailed on Oct. 18, 2025, 13 pages (with English translation).

*Primary Examiner* — Lisa M Caputo
(74) *Attorney, Agent, or Firm* — Fish & Richardson P.C.

(57) ABSTRACT

A waveguide line electrode structure is provided. The waveguide line electrode structure includes a first ground electrode, a signal electrode and a second ground electrode that are sequentially arranged spaced apart from each other; an optical waveguide including a first branch and a second branch; a first covering layer; a second covering layer and at least one electrode extension portion.

18 Claims, 5 Drawing Sheets

(56)                        References Cited

U.S. PATENT DOCUMENTS

| | | | |
|---|---|---|---|
| 7,242,821 B2 | 7/2007 | Bull et al. | |
| 2002/0154842 A1* | 10/2002 | Betts ..................... | G02F 1/0316 |
| | | | 385/2 |
| 2006/0067634 A1* | 3/2006 | Bull ......................... | G02B 6/14 |
| | | | 385/27 |
| 2020/0271963 A1 | 8/2020 | Iwatsuka et al. | |
| 2021/0157177 A1* | 5/2021 | Kharel ................. | G02F 1/0356 |

FOREIGN PATENT DOCUMENTS

| | | |
|---|---|---|
| CN | 111164496 | 5/2020 |
| CN | 111505845 | 8/2020 |
| CN | 112748589 | 5/2021 |
| CN | 112859389 A | 5/2021 |
| JP | 2002-040381 A | 2/2002 |
| JP | 2002-142650 A | 5/2002 |
| JP | 2005-506554 A | 3/2005 |
| JP | 2008-250080 A | 10/2008 |

* cited by examiner

WAVEGUIDE LINE ELECTRODE STRUCTURE AND ELECTRO-OPTIC MODULATOR

CROSS-REFERENCE TO RELATED APPLICATION

The present application is a national stage filing under 35 U.S.C. § 371 of International Application No. PCT/CN2022/100239, filed on Jun. 21, 2022, which claims priority to Chinese patent application No. 202110712563.3, filed on Jun. 25, 2021. The contents of these applications are incorporated herein by reference in their entirety.

TECHNICAL FIELD

The present disclosure relates to the technical field of photoelectric signals, and in particular, to a waveguide line electrode structure and an electro-optic modulator.

BACKGROUND

In recent years, rapid development of emerging network application services such as Internet of Things, driverless, telemedicine, and distance education has put forward higher requirements for high-speed and large-capacity communication technology. Optical communications have achieved rapid development in the direction of high-speed and large-capacity communications due to their characteristics such as large bandwidth, high reliability, low cost, and strong anti-interference ability. How to load high-speed electrical signals onto optical carriers is a core research content. An electro-optic modulator, as a device that converts electrical signals into optical signals, is one of the core devices in optical interconnection, optical computing and optical communication systems. Performance of the modulator plays an important role in a transmission distance and a transmission speed of the optical signals. With increasingly urgent requirements for the high-speed and large-capacity communication technology, higher requirements are also put forward for a modulation rate of the electro-optic modulator.

The electro-optic modulator is a modulator made by using an electro-optic effect of some electro-optic crystals, such as lithium niobate crystal (LiNbO3), gallium arsenide crystal (GaAs), and lithium tantalate crystal (LiTaO3). The electro-optic effect means that when a voltage is applied to an electro-optic crystal, a refractive index of the electro-optic crystal will change, resulting in change in characteristics of light waves passing through the crystal, and thus realizing modulation of a phase, an amplitude, an intensity and a polarization state of optical signals.

An input light wave of an MZ interferometer modulator is split into two equal beams at a one-to-two light splitting element after passing through a section of light path, which are transmitted through two optical waveguides respectively. The optical waveguides each are made of an electro-optic material, with a refractive index changing with an applied voltage, so that optical signals for the two beams have a phase difference therebetween when reaching a light combining element. If an optical path difference between the two beams is an integer multiple of the wavelength, the two beams are coherently enhanced. If the optical path difference between the two beams is ½ of the wavelength, the two beams are coherently suppressed, and the modulator has a very small output, so that the optical signals can be modulated by controlling the voltage.

However, during design of a coplanar waveguide line electrode structure of a high-speed electro-optic modulator, in order to prevent microwave reflection of electrical signals, it is necessary to keep impedance of an electrode material consistent with impedance of an input end. In addition, it is necessary not only to ensure that a transmission speed of the electrical signals is the same as or close to a group velocity of optical signals transmitted in a waveguide, but also to minimize a transmission loss of the electrical signals, which puts forward very high requirements for an electrode design.

SUMMARY

The present disclosure is intended to solve at least one of the technical problems in the prior art. To this end, an objective of the present disclosure is to propose a waveguide line electrode structure and an electro-optic modulator to improve a modulation effect on transmitted light.

Embodiments in a first aspect of the present disclosure provide a waveguide line electrode structure, comprising: a first ground electrode, a signal electrode and a second ground electrode that are sequentially arranged spaced apart from each other; an optical waveguide comprising a first branch and a second branch, the first branch being arranged in a first gap formed between the first ground electrode and the signal electrode, and the second branch being arranged in a second gap formed between the second ground electrode and the signal electrode; a first covering layer at least partially covering the first branch; a second covering layer at least partially covering the second branch; and at least one electrode extension portion, wherein each electrode extension portion extends from a first side of the signal electrode facing the first ground electrode, a second side of the signal electrode facing the second ground electrode, a third side of the first ground electrode facing the signal electrode or a fourth side of the second ground electrode facing the signal electrode to the first gap or the second gap adjacent to the side, and each electrode extension portion also extends to an upper surface of the first covering layer or the second covering layer.

The waveguide line electrode structure according to embodiments of the present disclosure is additionally provided with the covering layer located above the optical waveguide, and the electrode extension portion connected to the signal electrode or the ground electrode extends to the upper surface of the covering layer. By means of the waveguide line electrode structure according to embodiments of the present disclosure, it is ensured that a distance between the electrode extension portion for the signal electrode and the electrode extension portion for the ground electrode is close enough, and it is also ensured that there is a certain distance between an edge of the electrode extension portion and the corresponding optical waveguide. Therefore, by means of the waveguide line electrode structure according to this embodiment, electro-optical conversion efficiency is increased, and normal transmission of light in the first branch or the second branch is prevented from being affected, such that a modulation effect of the waveguide line electrode structure is significantly improved.

BRIEF DESCRIPTION OF THE DRAWINGS

In the accompanying drawings, the same reference signs denote the same or similar components or elements throughout a plurality of accompanying drawings unless otherwise specified. These accompanying drawings are not necessarily drawn to scale. It should be understood that these accompanying drawings depict only some implementations according to the present disclosure and should not be construed as limiting the scope of the present disclosure.

DETAILED DESCRIPTION OF EMBODIMENTS

Only some example embodiments are briefly described below. As can be appreciated by those skilled in the art, the described embodiments can be modified in various ways without departing from the spirit or scope of the present disclosure. Accordingly, the accompanying drawings and the description are considered as illustrative in nature, and not as restrictive.

Figures 1, 2:
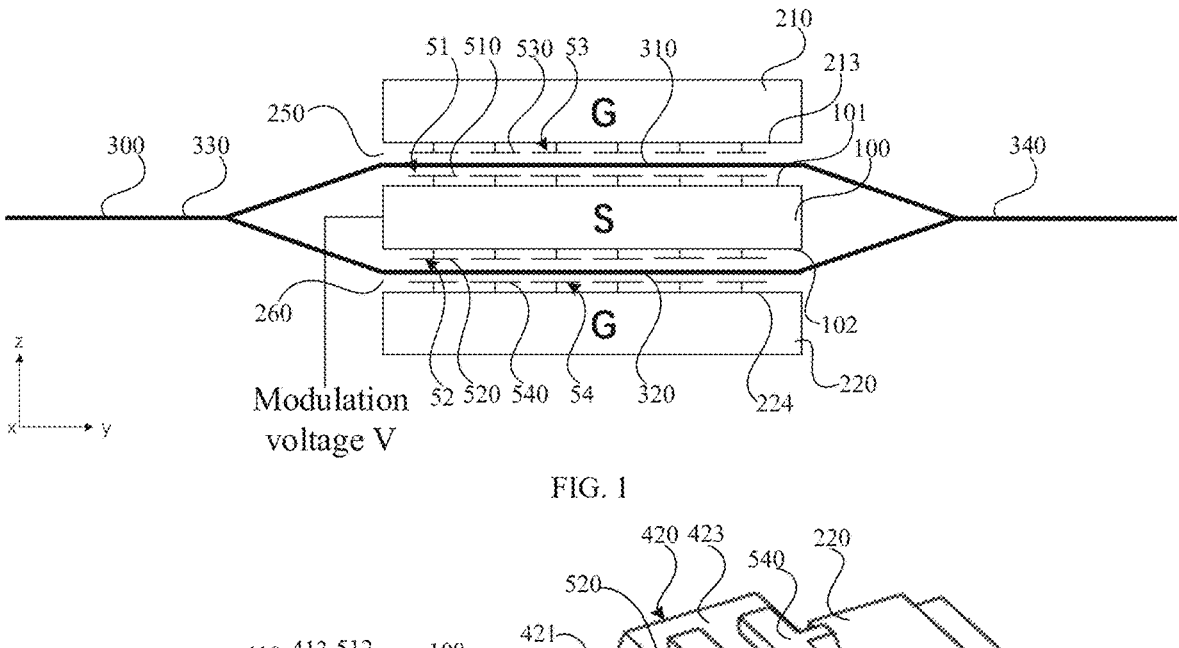
FIG. 1 shows a top view of a waveguide line electrode structure according to some example embodiments of the present disclosure.
FIG. 2 shows a schematic perspective view of the waveguide line electrode structure in FIG. 1.
Figures 3, 4:
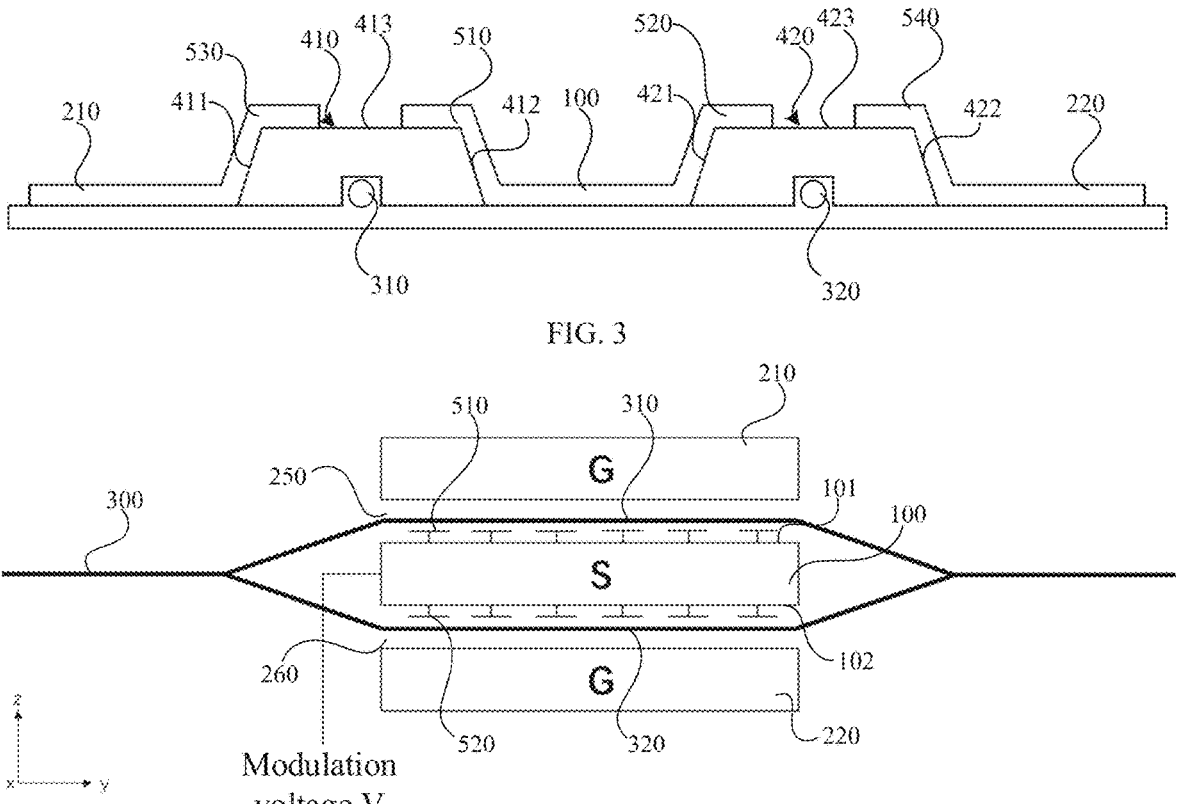
FIG. 3 shows a schematic cross-sectional view of the waveguide line electrode structure in FIG. 1.
FIG. 4 shows a top view of a waveguide line electrode structure according to some example embodiments of the present disclosure.

The present disclosure first provides a waveguide line electrode structure. FIG. 1 shows a top view of a waveguide line electrode structure according to an embodiment of the present disclosure; FIG. 2 shows a schematic perspective view of the waveguide line electrode structure in FIG. 1; and FIG. 3 shows a schematic cross-sectional view of the waveguide line electrode structure in FIG. 1. As shown in FIGS. 1-3, the waveguide line electrode structure comprises: a first ground electrode 210, a signal electrode 100, a second ground electrode 220, an optical waveguide 300, a first covering layer 410, a second covering layer 420, and at least one electrode extension portion. The first ground electrode 210, the signal electrode 100 and the second ground electrode 220 are sequentially arranged spaced apart from each other. The optical waveguide 300 comprises a first branch 310 and a second branch 320, the first branch 310 being arranged in a first gap 250 formed between the first ground electrode 210 and the signal electrode 100, and the second branch 320 being arranged in a second gap 260 formed between the second ground electrode 220 and the signal electrode 100. The first covering layer 410 and the second covering layer 420 respectively at least partially cover the first branch 310 or the second branch 320. Each electrode extension portion is arranged on a first side 101 of the signal electrode 100 facing the first ground electrode 210, a second side 102 of the signal electrode 100 facing the second ground electrode 220, a third side 213 of the first ground electrode 210 facing the signal electrode 100 or a fourth side 224 of the second ground electrode 220 facing the signal electrode 100. Each electrode extension portion extends from the side of the electrode where the electrode extension portion is located toward the first gap 250 or the second gap 260 adjacent to the side of the electrode, and each extension sub-electrode also extends to an upper surface of the first covering layer 410 or the second covering layer 420.

Specifically, as shown in FIG. 1, the first ground electrode 210, the signal electrode 100 and the second ground electrode 220 all extend in a first direction, that is, a y direction shown in the figure, and extension lengths of the three electrodes and their widths may be equal. The first ground electrode 210, the signal electrode 100 and the second ground electrode 220 are also arranged spaced apart from each other in a second direction, that is, a z direction shown in the figure. Therefore, the first gap 250 is formed between the first ground electrode 210 and the signal electrode 100, and the second gap 260 is formed between the second ground electrode 220 and the signal electrode 100. Widths of the first gap 250 and the second gap 260 may be equal. The three electrodes may be arranged in the same plane, that is, in a y-z plane shown in the figure. The three electrodes may be made of metal, and the signal electrode 100 is also connected to an external modulation circuit to apply a modulation voltage V between the first ground electrode 210 and the signal electrode 100 and between the second ground electrode 220 and the signal electrode 100, respectively. The optical waveguide 300 comprises a first trunk 330, a second trunk 340, the first branch 310, and the second branch 320. The first trunk 330 of the optical waveguide 300 is divided by a light splitting element (not shown in the figure) into the first branch 310 and the second branch 320 at a position adjacent to the three electrodes, wherein the first branch 310 extends into the first gap 250 and extends in the first direction (the y direction) in the gap, and the second branch 320 extends into the second gap 260 and also extends in the first direction (the y direction) in the gap, that is to say, the first branch 310 and the second branch 320 are kept parallel. When extending to a position away from the three electrodes, the first branch 310 and the second branch 320 are combined into the second trunk 340 by a light combining element (not shown in the figure). As shown in FIGS. 2 and 3, the first covering layer 410 covers above the first branch 310, and the second covering layer 420 covers above the second branch 320. The two covering layers also extend in the y direction shown in FIG. 1, and form two ridges in a third direction, that is, an x direction. A cross section of the covering layer may be in any suitable shape, such as a triangle, a rectangle, a trapezoid, or a semicircle. A waveguide line of the first branch 310 or the second branch 320 may be centrally arranged at a bottom of the covering layer. That is to say, as shown in FIG. 3, a cross section of the optical waveguide at the first branch 310 or the second branch 320 is located in the middle of a bottom of the cross section of the covering layer.

In this embodiment, at least one electrode extension portion may be four electrode extension portions. As shown in FIG. 1, a first electrode extension portion 51 is arranged on the first side 101 of the signal electrode 100 facing the first ground electrode 210; a second electrode extension portion 52 is arranged on the second side 102 of the signal electrode 100 facing the second ground electrode 220; a third electrode extension portion 53 is arranged on the third side 213 of the first ground electrode 210 facing the signal electrode 100; and a fourth electrode extension portion 54 is arranged on the fourth side 224 of the second ground electrode 220 facing the signal electrode 100.

In this embodiment, each electrode extension portion comprises: a plurality of extension sub-electrodes. Each of the extension sub-electrodes extends from one side of the first ground electrode, the second ground electrode or the signal electrode toward the first gap 250 or the second gap 260 adjacent to the side. Specifically, the first electrode extension portion 51 comprises a plurality of first extension sub-electrodes 510, and each of the first extension sub-electrodes 510 extends from the first side 101 toward the first gap 250; the second electrode extension portion 52 comprises a plurality of second extension sub-electrodes 520, and each of the second extension sub-electrodes 520 extends from the second side 102 toward the second gap 260; the third electrode extension portion 53 comprises a plurality of third extension sub-electrodes 530, and each of the third extension sub-electrodes 530 extends from the third side 213 toward the first gap 250; and the fourth electrode extension portion 54 comprises a plurality of fourth extension sub-electrodes 540, and each of the fourth extension sub-electrodes 540 extends from the fourth side 224 toward the second gap 260. Taking the first electrode extension portion 51 as an example, the plurality of first extension sub-electrodes 510 in the first electrode extension portion 51 are arranged spaced apart from each other along the first side 101, a root of each of the extension sub-electrodes is connected to the signal electrode 100, each of the extension sub-electrodes is also made of metal, and thus the modulation voltage applied to the signal electrode 100 can be further conducted and act on the first extension sub-electrodes 510. The plurality of second extension sub-electrodes 520 to fourth extension sub-electrodes 540 are arranged on one side of the corresponding signal electrode 100 or ground electrode in the same way, and will not be repeated here.

The specific structure of the extension sub-electrode is shown in FIG. 2. Taking the third extension sub-electrode 530 as an example, each third extension sub-electrode 53 may comprise an extension portion 531 and an electrode portion 532. The extension portion 531 extends from one side of the first ground electrode 210 toward the first gap 250 adjacent to the side. The electrode portion 532 is arranged at an extended end portion of the extension portion 531, and extends in a direction parallel to the first branch 310 (that is, the y direction in the figure). That is to say, the extension portion 531 and the electrode portion 532 of each extension sub-electrode are arranged perpendicular to each other. For another example, each first extension sub-electrode 510 may also comprise an extension portion 511 and an electrode portion 512. The extension portion 511 extends from one side of the signal electrode 100 toward the first gap 250 adjacent to the side. The electrode portion 512 is arranged at an extended end portion of the extension portion 511, and extends in the direction parallel to the first branch 310 (that is, the y direction in the figure). The second extension sub-electrode 520 and the fourth extension sub-electrode 540 have the same structure and arrangement as the first extension sub-electrode 510 and the third extension sub-electrode 530, and will not be repeated here. In this embodiment, the extension portion of each extension sub-electrode is connected to a midpoint of the electrode portion in its extension direction. That is to say, in the top view of the waveguide line electrode structure shown in FIG. 1, each extension sub-electrode is of a similarly T-shaped structure. In addition, lengths of the extension portions of all the extension sub-electrodes are equal, so that the electrode portions of all the extension sub-electrodes of each electrode extension portion are on the same straight line.

In the waveguide line electrode structure according to the present disclosure, with the provision of the extension sub-electrodes on the first ground electrode 210, the second ground electrode 220 and/or the signal electrode 100, an interval between the signal electrode 100 and the ground electrode is reduced, which is beneficial to reducing a transmission loss of an electrical signal of the modulation voltage. In addition, some inherent characteristics of the waveguide line electrode structure, such as impedance and a propagation speed of electrical signals, are closely related to some properties (such as the length of the extension portion and the length of the electrode portion) of these extension sub-electrodes. Therefore, during actual manufacturing of the waveguide line electrode structure, values of these properties can be flexibly set, such that the impedance of the electro-optic modulator made of the waveguide line electrode structure is the same as or similar to the impedance (generally 50Ω) of an input end, and the propagation speed of the electrical signals in a modulation circuit is the same as or similar to the speed of light in the optical waveguide 300, thereby improving the optical modulation effect.

The upper surface of the first covering layer 410 and/or the second covering layer 420 comprises: at least one inclined section. Each inclined section extends obliquely upward in a direction from the signal electrode 100, the first ground electrode 210 or the second ground electrode 220 toward the first branch 310 or the second branch 320 adjacent to the electrode, and the electrode extension portion extends to the upper surface of the first covering layer 410 or the second covering layer 420 via the inclined section. In this embodiment, the cross section of each of the first covering layer 410 and the second covering layer 420 may be a trapezoid with an inclined section. With the provision of the inclined section, the electrode extension portion for the corresponding ground electrode or signal electrode 100 can extend to the upper surface of the covering layer. As shown in FIGS. 2 and 3, the upper surface of the first covering layer 410 comprises a first inclined section 411, a first platform section 413 and a second inclined section 412 that are sequentially contiguous to each other, wherein the first inclined section 411 faces the first ground electrode 210, and the second inclined section 412 faces the signal electrode 100. The first inclined section 411 extends obliquely upward in the direction from the first ground electrode 210 to the first branch 310. The second inclined section 412 extends obliquely upward in the direction from the signal electrode 100 to the first branch 310. The upper surface of the second covering layer 420 comprises a third inclined section 421, a second platform section 423 and a fourth inclined section 422 that are sequentially contiguous to each other, wherein the third inclined section 421 faces the signal electrode 100, and the fourth inclined section 422 faces the second ground electrode 220. The third inclined section 421 extends obliquely upward in the direction from the signal electrode 100 to the second branch 320. The fourth inclined section 422 extends obliquely upward in the direction from the second ground electrode 220 to the second branch 320. The first electrode extension portion 51 extends to the first platform section 413 via the second inclined section 412, the second electrode extension portion 52 extends to the second platform section 423 via the third inclined section 421, the third electrode extension portion 53 extends to the first platform section 413 via the first inclined section 411, and the fourth electrode extension portion 54 extends to the second platform section 423 via the fourth inclined section

422. In the embodiment, only the electrode extension portion itself extends to the corresponding inclined section, the corresponding first ground electrode 210, second ground electrode 220 or signal electrode 100 does not extend to the corresponding inclined section, and edges of the electrodes each are also arranged at a distance from an edge of the corresponding covering layer. However, it may be understood that in some other embodiments, a part of each of the three electrodes may also extend to the corresponding inclined section. That is to say, the electrode extension portion connected to the electrode extends upward from the inclined section.

In this embodiment, there are the same number of first extension sub-electrodes 510 of the first electrode extension portion 51 to fourth extension sub-electrodes 540 of the fourth electrode extension portion 54. In addition, the plurality of first extension sub-electrodes 510 and the plurality of third extension sub-electrodes 530 are arranged in a one-to-one correspondence on the first platform section 413, so that when viewed from the y-z plane, the electrode portion of each first extension sub-electrode 510 is aligned with the electrode portion of the corresponding third extension sub-electrode 530, and the first branch 310 is located between the electrode portions of the first extension sub-electrodes 510 and the electrode portions of the third extension sub-electrodes 530. Similarly, the plurality of second extension sub-electrodes 520 and the plurality of fourth extension sub-electrodes 540 are arranged in a one-to-one correspondence on the second platform section 423, so that when viewed from the y-z plane, the electrode portion of each second extension sub-electrode 520 is aligned with the electrode portion of the corresponding fourth extension sub-electrode 540, and the second branch 320 is located between the electrode portions of the second extension sub-electrodes 520 and the electrode portions of the fourth extension sub-electrodes 540.

Generally, an electrical loss of a modulation signal voltage (i.e., a voltage applied between the signal electrode 100 and the ground electrode) is related to sizes of the first gap 250 and the second gap 260. The smaller the first gap 250 and the second gap 260 (i.e., the closer the signal electrode 100 and the ground electrode), the higher the electro-optical modulation efficiency. However, if the signal electrode 100 or the ground electrode is arranged too close to the first branch 310 or the second branch 320 of the optical waveguide 300, it may cause the electrode to affect the normal transmission of light in the first branch 310 or the second branch 320. The waveguide line electrode structure according to this embodiment is additionally provided with the covering layer located above the optical waveguide 300, and the electrode extension portion connected to the signal electrode 100 or the ground electrode extends to the upper surface of the covering layer. With such an arrangement, it is ensured that a distance between the electrode extension portion for the signal electrode 100 and the electrode extension portion for the ground electrode is close enough, and it is also ensured that there is a certain distance between the electrode extension portion and the corresponding optical waveguide 300 (i.e., the first branch 310 or the second branch 320). Therefore, by means of the waveguide line electrode structure according to this embodiment, electro-optical conversion efficiency is increased, and normal transmission of light in the first branch 310 or the second branch 320 is prevented from being affected, such that a modulation effect of the waveguide line electrode structure is significantly improved.

Figure 5:
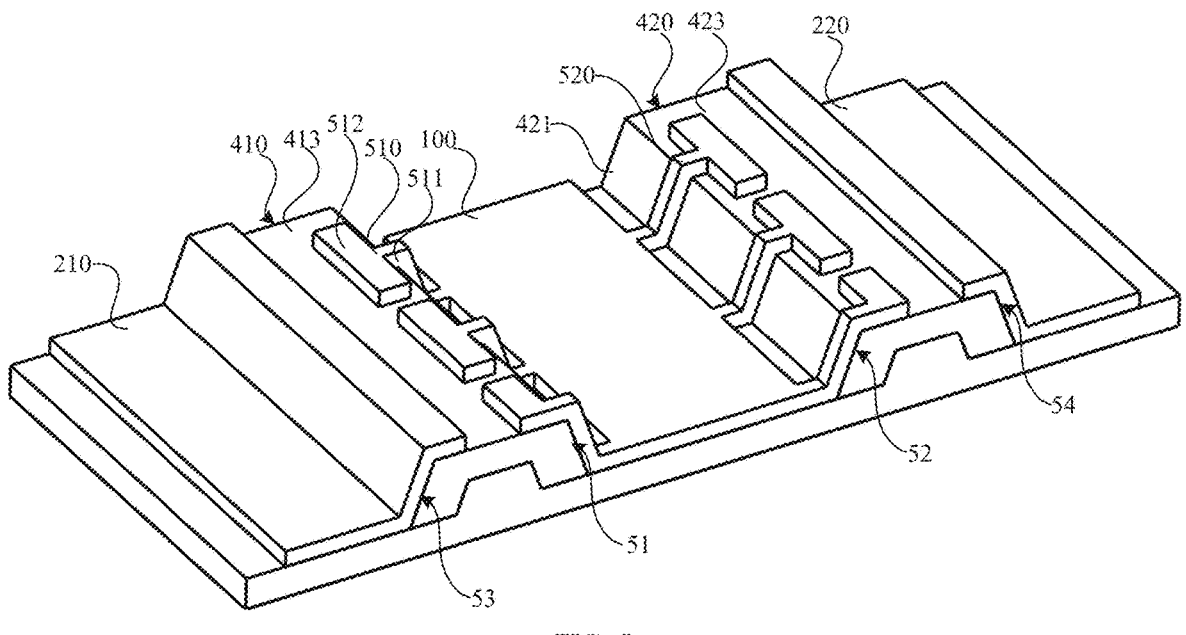
FIG. 5 shows a schematic perspective view of the waveguide line electrode structure in FIG. 4.

Some other modified embodiments of the present disclosure are further described below with reference to FIGS. 4-9. FIG. 4 shows a top view of a waveguide line electrode structure according to another embodiment of the present disclosure. FIG. 5 shows a schematic perspective view of the waveguide line electrode structure in FIG. 4. As shown in FIG. 4, the first electrode extension portion 51 comprises a plurality of first extension sub-electrodes 510, and each of the first extension sub-electrodes 510 extends from the first side 101 toward the first gap 250; and the second electrode extension portion 52 comprises a plurality of second extension sub-electrodes 520, and each of the second extension sub-electrodes 520 extends from the second side 102 toward the second gap 260. That is to say, the third electrode extension portion 53 and the fourth electrode extension portion 54 each do not comprise extension sub-electrodes, but extend outward entirely from one side of the corresponding electrode as shown in FIG. 5. In some other embodiments, the first covering layer 410 may also be designed to comprise only the second inclined section 412 facing the signal electrode 100. For example, the cross section of the first covering layer 410 may be designed as a right-angled trapezoid, with a right-angled surface facing the first ground electrode 210 and an inclined surface (i.e., the second inclined section 412) facing the signal electrode 100, and the third electrode extension portion 53 may directly extend to the upper surface of the first covering layer 410. The second covering layer 420 may also be designed to comprise only the third inclined section 421 facing the signal electrode 100. For example, the cross section of the second covering layer 420 may be designed as a right-angled trapezoid, with a right-angled surface facing the second ground electrode 220 and an inclined surface (i.e., the third inclined section 421) facing the signal electrode 100, and the fourth electrode extension portion 54 may directly extend to the upper surface of the second covering layer 420.

Figure 6:
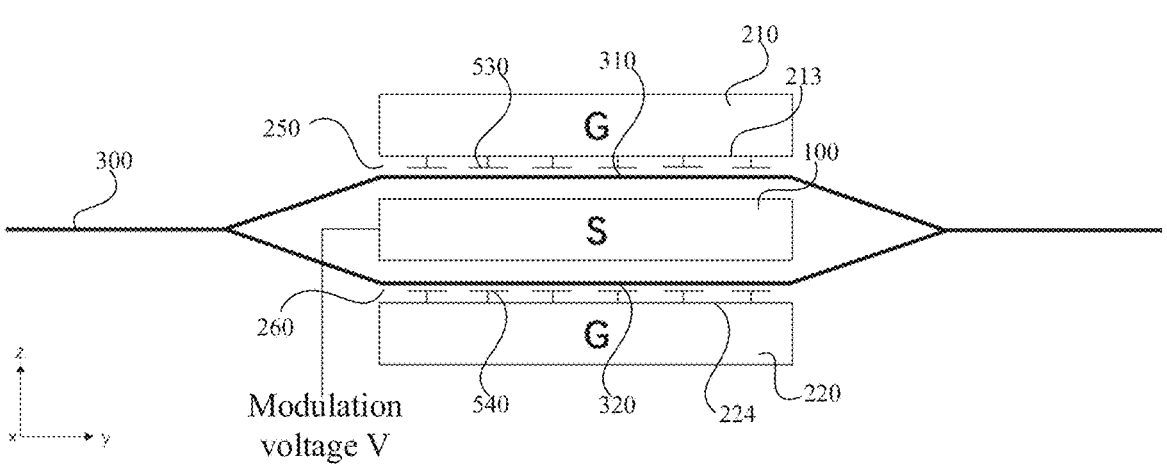
FIG. 6 shows a top view of a waveguide line electrode structure according to some example embodiments of the present disclosure.
Figure 7:
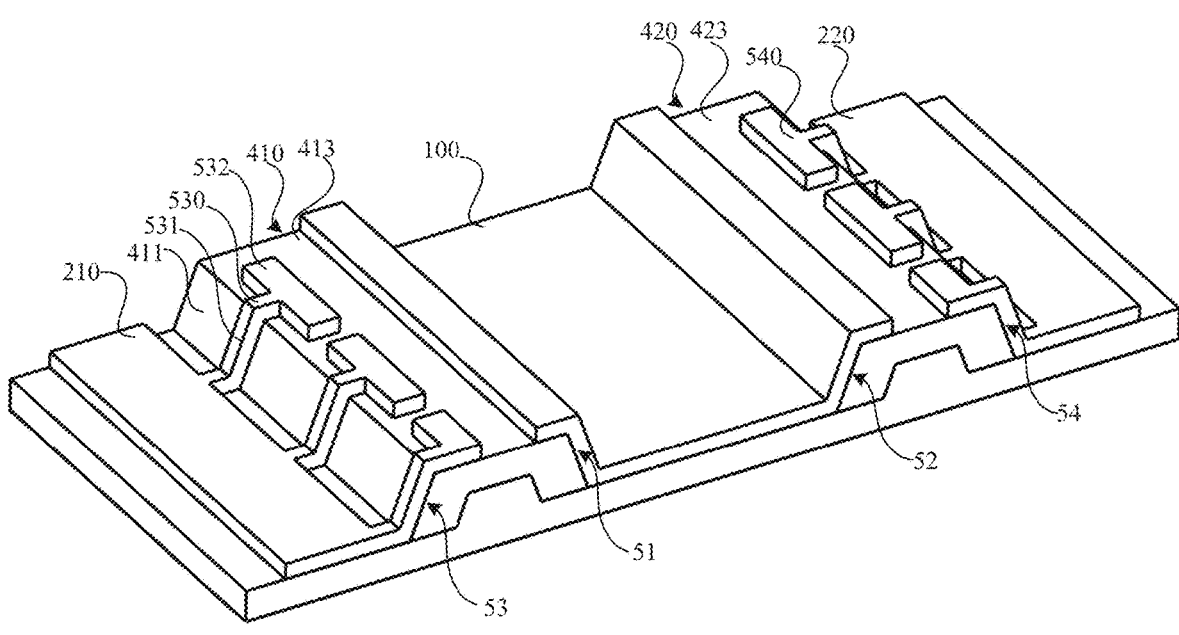
FIG. 7 shows a schematic perspective view of the waveguide line electrode structure in FIG. 6.

FIG. 6 shows a top view of a waveguide line electrode structure according to still another embodiment of the present disclosure, and FIG. 7 shows a schematic perspective view of the waveguide line electrode structure in FIG. 6. As shown in FIG. 6, the third electrode extension portion 53 comprises a plurality of third extension sub-electrodes 530, and each of the third extension sub-electrodes 530 extends from the third side 213 toward the first gap 250; and the fourth electrode extension portion 54 comprises a plurality of fourth extension sub-electrodes 540, and each of the fourth extension sub-electrodes 540 extends from the fourth side 224 toward the second gap 260. That is to say, the first electrode extension portion 51 and the second electrode extension portion 52 each do not comprise extension sub-electrodes, but extend outward entirely from one side of the corresponding electrode as shown in FIG. 7. In some other embodiments, the first covering layer 410 may also be designed to comprise only the first inclined section 411 facing the first ground electrode 210. For example, the cross section of the first covering layer 410 may be designed as a right-angled trapezoid, with a right-angled surface facing the signal electrode 100 and an inclined surface (i.e., the first inclined section 411) facing the first ground electrode 210, and the first electrode extension portion 51 may directly extend to the upper surface of the first covering layer 410. The second covering layer 420 may also be designed to comprise only the fourth inclined section 422 facing the second ground electrode 220. For example, the cross section of the second covering layer 420 may be designed as a right-angled trapezoid, with a right-angled surface facing the signal electrode 100 and an inclined surface (i.e., the fourth inclined section 422) facing the second ground electrode 220, and the second electrode extension portion 52 may directly extend to the upper surface of the second covering layer 420.

Figure 8:
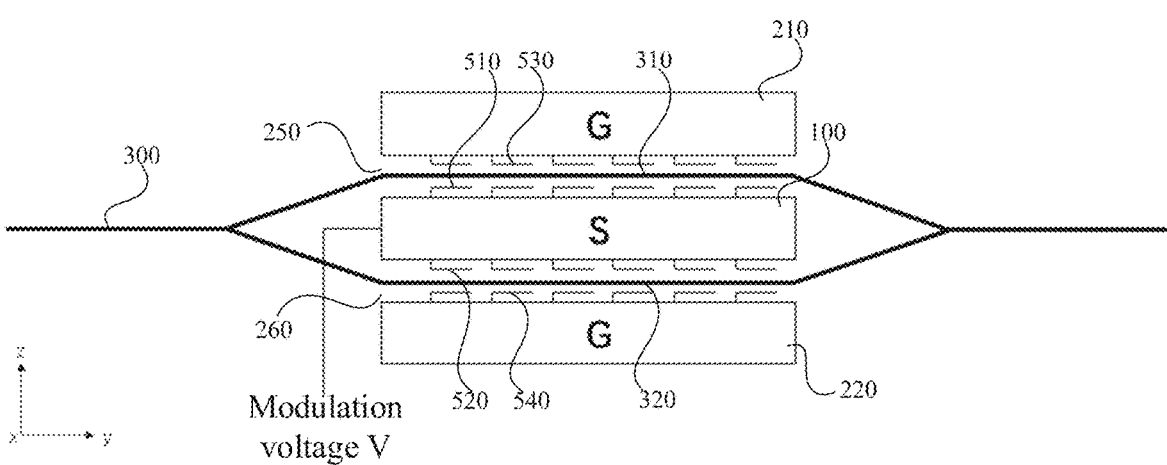
FIG. 8 shows a top view of a waveguide line electrode structure according to some example embodiments of the present disclosure.

FIG. 8 shows a top view of a waveguide line electrode structure according to yet another embodiment of the present disclosure. Although in the embodiments shown in FIGS. 1-7, the extension portion of each extension sub-electrode is connected to the corresponding electrode portion at a position close to a midpoint thereof, in the embodiment shown in FIG. 8, in each extension sub-electrode, the end portion of the extension portion may also be connected to an end of the electrode portion in its extension direction. That is to say, when viewed from the y-z plane, each extension sub-electrode is L-shaped.

Figure 9:
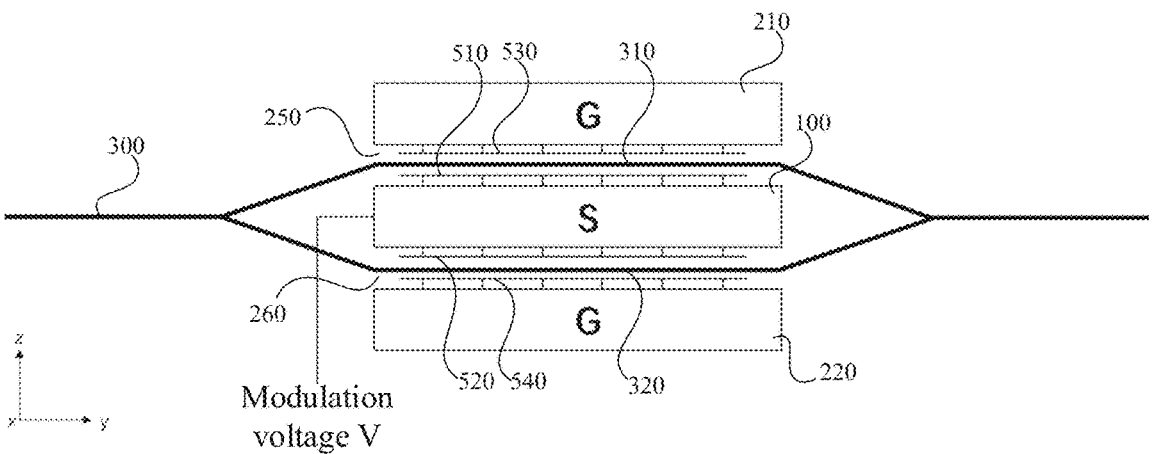
FIG. 9 shows a top view of a waveguide line electrode structure according to some example embodiments of the present disclosure.

FIG. 9 shows a top view of a waveguide line electrode structure according to still yet another embodiment of the present disclosure. Although in a plurality of embodiments shown in FIGS. 1-8, in each electrode extension portion, the electrode portions of two adjacent extension sub-electrodes are spaced apart from each other, in some other embodiments shown in FIG. 9, the electrode portions of two adjacent extension sub-electrodes may also be connected end to end. That is to say, in each electrode extension portion, the electrode portions of all the extension sub-electrodes are sequentially connected to form a straight line parallel to the first branch 310 or the second branch 320.

Figure 10:
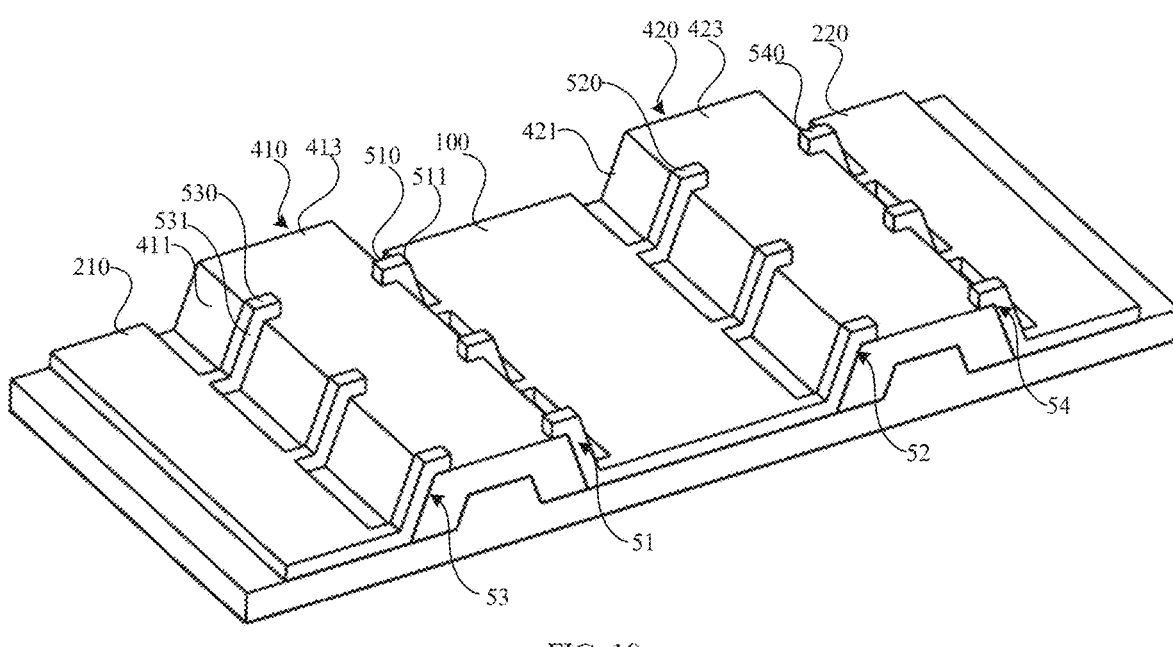
FIG. 10 shows a schematic perspective view of a waveguide line electrode structure according to some example embodiments of the present disclosure.
Figure 11:
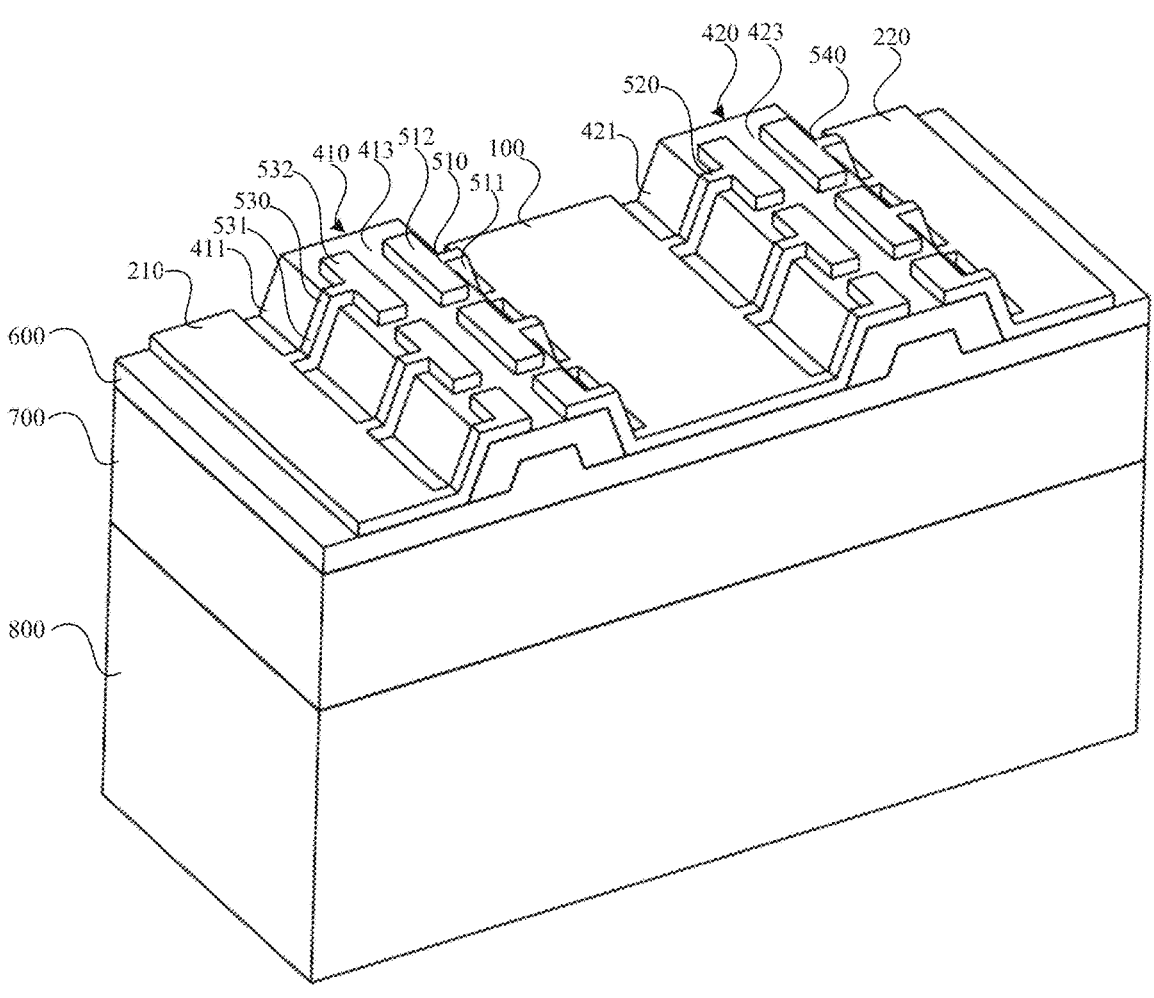
FIG. 11 is a schematic perspective view of an electro-optic modulator according to some example embodiments of the present disclosure.

FIG. 10 shows a schematic perspective view of a waveguide line electrode structure according to a further embodiment of the present disclosure. The waveguide line electrode structure of this embodiment is different from the waveguide line electrode structure shown in FIG. 2 in that an extension sub-electrode of each electrode extension portion comprises only an extension portion, but does not comprise an electrode portion. On the first platform section 413 of the first covering layer 410, an end of the extension portion of each first extension sub-electrode 510 is aligned with an end of the extension portion of the corresponding third extension sub-electrode 530, and on the second platform section 423 of the second covering layer 420, an end of the extension portion of each second extension sub-electrode 520 is aligned with an end of the extension portion of the corresponding fourth extension sub-electrode 540.

It should be noted that although in the plurality of embodiments described above, each electrode extension portion extends to the platform section of the corresponding covering layer, in some other embodiments, each electrode extension portion may extend only to the inclined section. In the case where the electrode extension portion comprises extension sub-electrodes, an end of each of the extension sub-electrodes may also extend only to the inclined section. In some other embodiments, the covering layer may be provided with no platform section, and for example, the upper surface of the covering layer is composed of only two inclined sections (that is, the cross section of the covering layer is triangular). In this case, each electrode extension portion may extend only to the inclined section. In some other embodiments, the covering layer may be provided with no inclined section or platform section, and for example, the upper surface of the covering layer is composed of only an arc-shaped surface (that is, the cross section of the covering layer is semicircular or arc-shaped). In this case, each electrode extension portion may extend to the arc-shaped surface.

In addition, a refractive index of the covering layer is less than that of the optical waveguide 300 to prevent light transmitted in the optical waveguide 300 from being emitted.

According to another aspect of the present disclosure, the present disclosure further provides an electro-optic modulator. FIG. 8 is a schematic perspective view of an electro-optic modulator according to an embodiment of the present disclosure. The electro-optic modulator comprises a substrate 800, an isolation layer 700 formed on a surface of the substrate 800, and a thin film layer 600 formed on a surface of the isolation layer 700. The coplanar waveguide line electrode structure as described above is provided on the thin film layer 600. The thin film layer 600 may be made of a photoelectric material, which may specifically be an etched X-cut, Y-cut, or Z-cut thin film of lithium niobate. The substrate 800 may be made of silicon, silicon dioxide, a multilayer material of silicon and silicon dioxide, or a multilayer material of silicon dioxide, metal and silicon. Any one of the signal electrode 100, the first ground electrode 210 and the second ground electrode 220 and the extension sub-electrodes connected thereto may be formed by etching. In addition, the electro-optic modulator further comprises: an optical assembly (not shown in the figure). The optical assembly may comprise the above-mentioned light splitting element and light combining element, and is arranged on an upper surface of the thin film layer. The light splitting element is configured to split light propagating in the optical waveguide 300 into light in the first branch 310 and light in the second branch 320, and the light combining element is configured to combine the light in the first branch 310 and the light in the second branch 320 into the light propagating in the optical waveguide 300 again.

A specific process of manufacturing the electro-optic modulator may comprise first preparing the substrate 800 and the isolation layer 700, forming the thin film layer 600 on an upper surface of the isolation layer 700, then arranging the first branch 310 and the second branch 320 of the optical waveguide 300, and providing the first covering layer 410 and the second covering layer 420 on the first branch 310 and the second branch 320. Finally, the first ground electrode 210, the second ground electrode 220, the signal electrode 100 and the electrode extension portions connected to three electrodes are further formed on the thin film layer 600 and the covering layer. Taking the first ground electrode 210 and the third extension sub-electrode 530 as an example, a metal layer may be grown at positions of the first ground electrode 210 and the third extension sub-electrode 530 on the thin film layer 600 and the covering layer, then a mask may be provided at the positions where the first ground electrode 210 and the third extension sub-electrode 530 are finally formed, and finally an integrated pattern of the first ground electrode 210 and the third extension sub-electrode 530 may be manufactured by etching. The first inclined section 411 of the first covering layer 410 provides a support surface for the extension portion of the third extension sub-electrode 530 during the etching. The forming of the signal electrode 100 and the first and second extension sub-electrodes 510 and 520 and the forming of the second ground electrode 220 and the fourth extension sub-electrode 540 are similar to the above process, and will not be repeated here.

In addition, although in this embodiment, lower surfaces of the signal electrode 100, the first ground electrode 210 and the second ground electrode 220 are located on the thin film layer 600, in some other embodiments, the three electrodes may also penetrate through the thin film layer 600 and be in direct contact with a surface of the isolation layer 700.

It should be understood that, in this description, the orientations or positional relationships or dimensions denoted by the terms, such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential", are the orientations or positional relationships or dimensions shown on the basis of the accompanying drawings, and these terms are used merely for ease of description, rather than indicating or implying that the device or element referred to must have particular orientations and be constructed and operated in the particular orientations, and therefore should not be construed as limiting the scope of protection of the present disclosure.

In addition, the terms such as "first", "second" and "third" are merely for descriptive purposes and should not be construed as indicating or implying relative importance or implicitly indicating the number of technical features indicated. Thus, the features defined with "first", "second" and "third" may explicitly or implicitly comprise one or more features. In the description of the present disclosure, the term "a plurality of" means two or more, unless otherwise explicitly and specifically defined.

In the present disclosure, unless expressly stated or defined otherwise, the terms such as "mounting", "connection", "connected" and "fixing" should be interpreted broadly, for example, they may be a fixed connection, a detachable connection, or an integrated connection; may be mechanical connection, or electrical connection, or communication; and may be a direct connection or an indirect connection by means of an intermediate medium, or may be internal communication between two elements or interaction between the two elements. For those of ordinary skill in the art, the specific meanings of the above terms in the present disclosure can be understood according to specific circumstances.

In the present disclosure, unless expressly stated or defined otherwise, the expression of the first feature being "above" or "below" the second feature may comprise the case that the first feature is in direct contact with the second feature, or the case that the first feature and the second feature are not in direct contact but are contacted via another feature therebetween. Furthermore, the first feature being "over", "above" or "on" the second feature comprises the case that the first feature is directly or obliquely above the second feature, or merely indicates that the first feature is at a higher level than the second feature. The first feature being "below", "under" or "beneath" the second feature comprises the case that the first feature is directly or obliquely below the second feature, or merely indicates that the first feature is at a lower level than the second feature.

This description provides many different implementations or examples that can be used to implement the present disclosure. It should be understood that these different implementations or examples are purely illustrative and are not intended to limit the scope of protection of the present disclosure in any way. On the basis of the disclosure of the description of the present disclosure, those skilled in the art will be able to conceive of various changes or substitutions. All these changes or substitutions shall fall within the scope of protection of the present disclosure. Therefore, the scope of protection of the present disclosure shall be subject to the scope of protection of the claims.

What is claimed is:

1. A waveguide line electrode structure, comprising:
a first ground electrode, a signal electrode, and a second ground electrode, wherein the first ground electrode, the signal electrode, and the second ground electrode are sequentially arranged spaced apart from each other;
an optical waveguide comprising a first branch and a second branch, the first branch being arranged in a first gap formed between the first ground electrode and the signal electrode, and the second branch being arranged in a second gap formed between the second ground electrode and the signal electrode;
a first covering layer at least partially covering the first branch;
a second covering layer at least partially covering the second branch; and
at least one electrode extension portion, wherein each electrode extension portion extends from a first side of the signal electrode facing the first ground electrode, a second side of the signal electrode facing the second ground electrode, a third side of the first ground electrode facing the signal electrode or a fourth side of the second ground electrode facing the signal electrode to the first gap or the second gap adjacent to the signal electrode, and each electrode extension portion extends to an upper surface of the first covering layer or the second covering layer,
wherein the upper surface of at least one of the first covering layer or the second covering layer comprises at least one inclined section, each inclined section extending obliquely upward in a direction from the signal electrode, the first ground electrode, or the second ground electrode toward the first branch or the second branch adjacent to the signal electrode,
wherein only corresponding portions of the at least one electrode extension portion are configured to directly contact the first covering layer or the second covering layer, and the first ground electrode, the signal electrode, and the second ground electrode are not in direct contact with the first covering layer or the second covering layer.

2. The waveguide line electrode structure according to claim 1,
wherein
the electrode extension portion extends to the upper surface of the first covering layer or the second covering layer via the inclined section; or
the electrode extension portion and at least a part of the signal electrode connected to the electrode extension portion extend to the upper surface of the first covering layer or the second covering layer via the inclined section.

3. The waveguide line electrode structure according to claim 2, wherein the electrode extension portion comprises:
a plurality of extension sub-electrodes, each of the extension sub-electrodes extending from one side of the first ground electrode, the second ground electrode or the signal electrode toward the first gap or the second gap adjacent to the side.

4. The waveguide line electrode structure according to claim 3, wherein each of the extension sub-electrodes comprises:
an extension portion extending from one side of the first ground electrode, the second ground electrode or the signal electrode toward the first gap or the second gap adjacent to the side.

5. The waveguide line electrode structure according to claim 4, wherein each of the extension sub-electrodes further comprises:

an electrode portion arranged at an extended end portion of the extension portion and extending in a direction parallel to the first branch or the second branch.

6. The waveguide line electrode structure according to claim 3, wherein at least one of the upper surface of the first covering layer or the second covering layer further comprises:

a platform section contiguous to a higher side edge of the inclined section, wherein the optical waveguide is arranged below the platform section, and an end of the extension sub-electrode is arranged on the platform section or the inclined section.

7. The waveguide line electrode structure according to claim 3, wherein in each electrode extension portion, electrode portions of two adjacent extension sub-electrodes are spaced apart from each other.

8. The waveguide line electrode structure according to claim 3, wherein in each electrode extension portion, electrode portions of two adjacent extension sub-electrodes are connected end to end.

9. The waveguide line electrode structure according to claim 1, wherein the at least one electrode extension portion comprises:

a first electrode extension portion arranged on the first side of the signal electrode facing the first ground electrode;

a second electrode extension portion arranged on the second side of the signal electrode facing the second ground electrode;

a third electrode extension portion arranged on the third side of the first ground electrode facing the signal electrode; and a fourth electrode extension portion arranged on the fourth side of the second ground electrode facing the signal electrode.

10. The waveguide line electrode structure according to claim 9, wherein the first electrode extension portion comprises a plurality of first extension sub-electrodes, and each of the first extension sub-electrodes extends from the first side toward the first gap; and the second electrode extension portion comprises a plurality of second extension sub-electrodes, and each of the second extension sub-electrodes extends from the second side toward the second gap.

11. The waveguide line electrode structure according to claim 9, wherein the third electrode extension portion comprises a plurality of third extension sub-electrodes, and each of the third extension sub-electrodes extends from the third side toward the first gap; and the fourth electrode extension portion comprises a plurality of fourth extension sub-electrodes, and each of the fourth extension sub-electrodes extends from the fourth side toward the second gap.

12. The waveguide line electrode structure according to claim 9, wherein the first electrode extension portion comprises a plurality of first extension sub-electrodes, and each of the first extension sub-electrodes extends from the first side toward the first gap;

the second electrode extension portion comprises a plurality of second extension sub-electrodes, and each of the second extension sub-electrodes extends from the second side toward the second gap;

the third electrode extension portion comprises a plurality of third extension sub-electrodes, and each of the third extension sub-electrodes extends from the third side toward the first gap; and the fourth electrode extension portion comprises a plurality of fourth extension sub-electrodes, and each of the fourth extension sub-electrodes extends from the fourth side toward the second gap.

13. The waveguide line electrode structure according to claim 12, wherein each of the first extension sub-electrodes in the first electrode extension portion is arranged opposite the corresponding third extension sub-electrode in the third electrode extension portion; and each of the second extension sub-electrodes in the second electrode extension portion is arranged opposite the corresponding fourth extension sub-electrode in the fourth electrode extension portion.

14. The waveguide line electrode structure according to claim 9, wherein the upper surface of the first covering layer comprises a first inclined section, a first platform section, and a second inclined section, wherein the first inclined section, the first platform section, and the second inclined section are sequentially contiguous to each other, the first inclined section facing the first ground electrode, and the second inclined section facing the signal electrode; and the upper surface of the second covering layer comprises a third inclined section, a second platform section, and a fourth inclined section, wherein the third inclined section, the second platform section, and the fourth inclined section are sequentially contiguous to each other, the third inclined section facing the signal electrode, and the fourth inclined section facing the second ground electrode, wherein the first electrode extension portion extends to the first platform section via the second inclined section, the second electrode extension portion extends to the second platform section via the third inclined section, the third electrode extension portion extends to the first platform section via the first inclined section, and the fourth electrode extension portion extends to the second platform section via the fourth inclined section.

15. The waveguide line electrode structure according to claim 1, wherein a refractive index of at least one of the first covering layer or the second covering layer is less than that of the optical waveguide.

16. An electro-optic modulator, comprising:

a substrate;

an isolation layer arranged on an upper surface of the substrate;

a thin film layer arranged on an upper surface of the isolation layer, the thin film layer being made of a photoelectric material;

a waveguide line electrode structure, wherein the waveguide line electrode structure is arranged on an upper surface of the thin film layer and wherein the waveguide line electrode structure comprises:

a first ground electrode, a signal electrode, and a second ground electrode, wherein the first ground electrode, the signal electrode, and the second ground electrode are sequentially arranged spaced apart from each other;

an optical waveguide comprising a first branch and a second branch, the first branch being arranged in a first gap formed between the first ground electrode and the signal electrode, and the second branch being arranged in a second gap formed between the second ground electrode and the signal electrode;

a first covering layer at least partially covering the first branch;

a second covering layer at least partially covering the second branch; and at least one electrode extension portion, wherein each electrode extension portion extends from a first side of the signal electrode facing the first ground electrode, a second side of the signal electrode facing the second ground electrode, a third side of the first ground electrode facing the signal electrode or a fourth side of the second ground electrode facing the signal electrode to the first gap or the second gap adjacent to the signal electrode, and each electrode extension portion extends to an upper surface of the first covering layer or the second covering layer, wherein the upper surface of at least one of the first covering layer or the second covering layer comprises at least one inclined section, each inclined section extending obliquely upward in a direction from the signal electrode, the first ground electrode or the second ground electrode toward the first branch or the second branch adjacent to the signal electrode, wherein only corresponding portions of the at least one electrode extension portion are configured to directly contact the first covering layer or the second covering layer, and the first ground electrode, the signal electrode, and the second ground electrode are not in direct contact with the first covering layer or the second covering layer; and an optical assembly arranged on the upper surface of the thin film layer and configured to:

split light propagating in the optical waveguide into light in the first branch and light in the second branch, and combine the light in the first branch and the light in the second branch into the light propagating in the optical waveguide again.

17. The electro-optic modulator according to claim 16, wherein lower surfaces of the signal electrode, the first ground electrode and the second ground electrode penetrate through the thin film layer and are in direct contact with the isolation layer.

18. The electro-optic modulator according to claim 16, wherein the thin film layer is an etched X-cut, Y-cut, or Z-cut thin film of lithium niobate.

\* \* \* \* \*